Jan. 5, 1932. E. E. KELLEMS 1,839,320
CABLE REEL TRAILER
Filed June 3, 1931 2 Sheets-Sheet 1

INVENTOR
E. E. Kellems
BY
ATTORNEY

Jan. 5, 1932.  E. E. KELLEMS  1,839,320
CABLE REEL TRAILER
Filed June 3, 1931  2 Sheets-Sheet 2
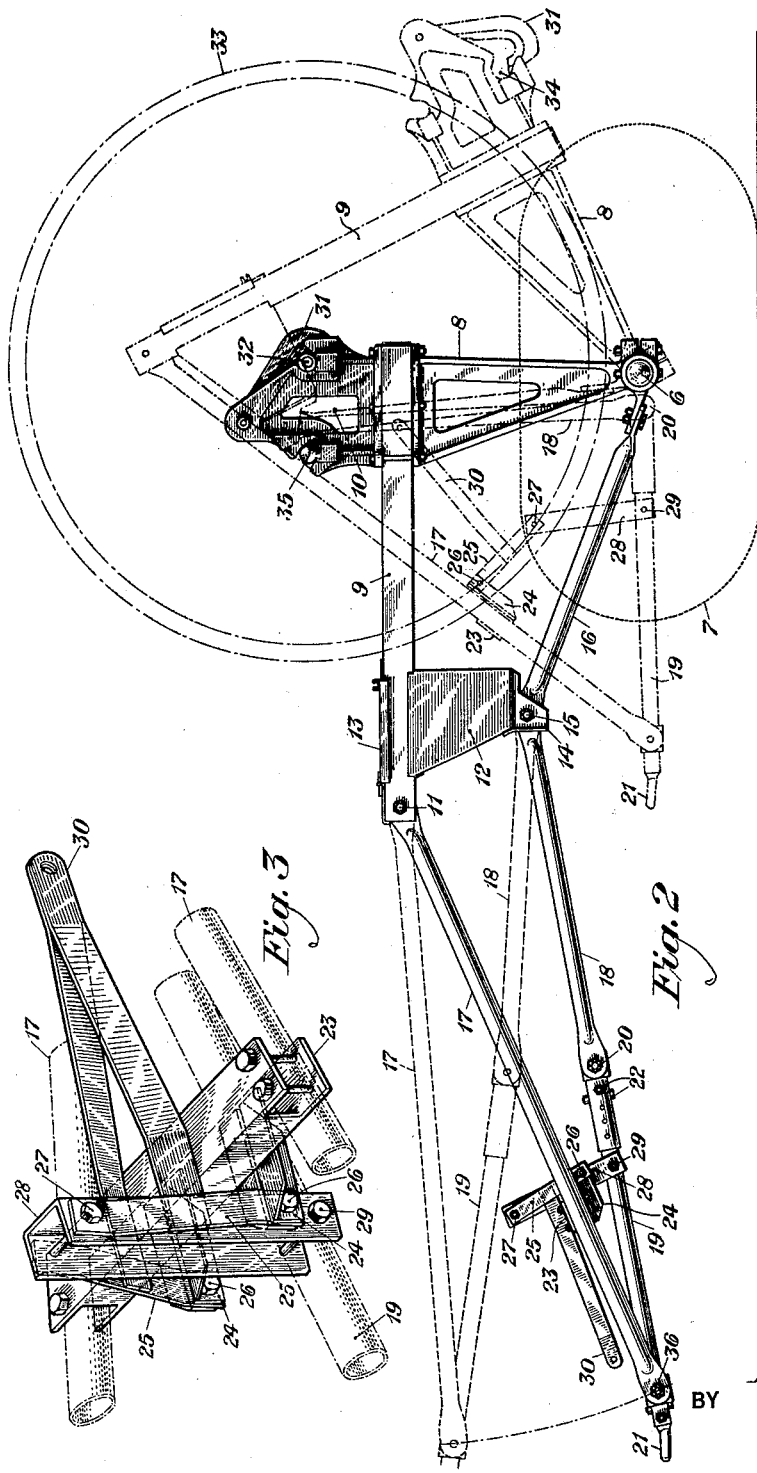
INVENTOR
*E. E. Kellems*
BY
ATTORNEY Patented Jan. 5, 1932

1,839,320

UNITED STATES PATENT OFFICE

EDGAR E. KELLEMS, OF FOREST HILLS, NEW YORK, ASSIGNOR TO AMERICAN TELEPHONE AND TELEGRAPH COMPANY, A CORPORATION OF NEW YORK

CABLE REEL TRAILER

Application filed June 3, 1931. Serial No. 541,914.

This invention relates to trailers, and more particularly to devices of this character which are adapted to be used in connection with the loading, transporting and unloading of cable reels.

One of the objects of the invention consists in the provision of a collapsible trailer including a main frame fulcrumed on suitable mobile supporting members, such as wheels or the like, where it may be rotated to load or unload cable reels, and having a pivotally connected tongue which may be attached to a tractor vehicle whereby when the main frame is rotated or tilted rearwardly and engages the projecting ends of a cable reel spindle, the forward movement of the tongue will automatically straighten the main frame so that it will lift and carry the cable reel.

Another object consists in the provision of control mechanism which functions to lock the main frame and tongue member in an extended or normal position, and which acts as a cushion or absorber to take up the shock when the main frame and tongue member are returning to the extended position under weight of a cable reel after being in a collapsed position.

A further object consists in the provision of a trailer having separable elements adapted to be detached one from the other, so that in case of breakage of a part it may be detached for repair or other purpose and again attached without dismantling or affecting the other elements of the trailer.

These and further objects will be apparent from the following description when considered in connection with the accompanying drawings in which one modification of the invention is illustrated.

In the drawings, Figure 1 is a top plan view of the improved device, showing the main frame and tongue in their normal or extended position for carrying a reel; the mobile supporting members for the trailer being omitted.

Fig. 2 is a side elevation showing the trailer in extended position with a cable reel mounted thereon, and in collapsed position to load or unload the cable reel; full lines indicate the extended position of the trailer and dotted lines the collapsed position thereof.

Fig. 3 is an enlarged detail perspective view of the locking or control mechanism for securing the main frame and tongue together in extended position and for absorbing the shock between these members upon returning from a collapsed position to an extended position under weight of a loaded cable reel.

Figure 1:
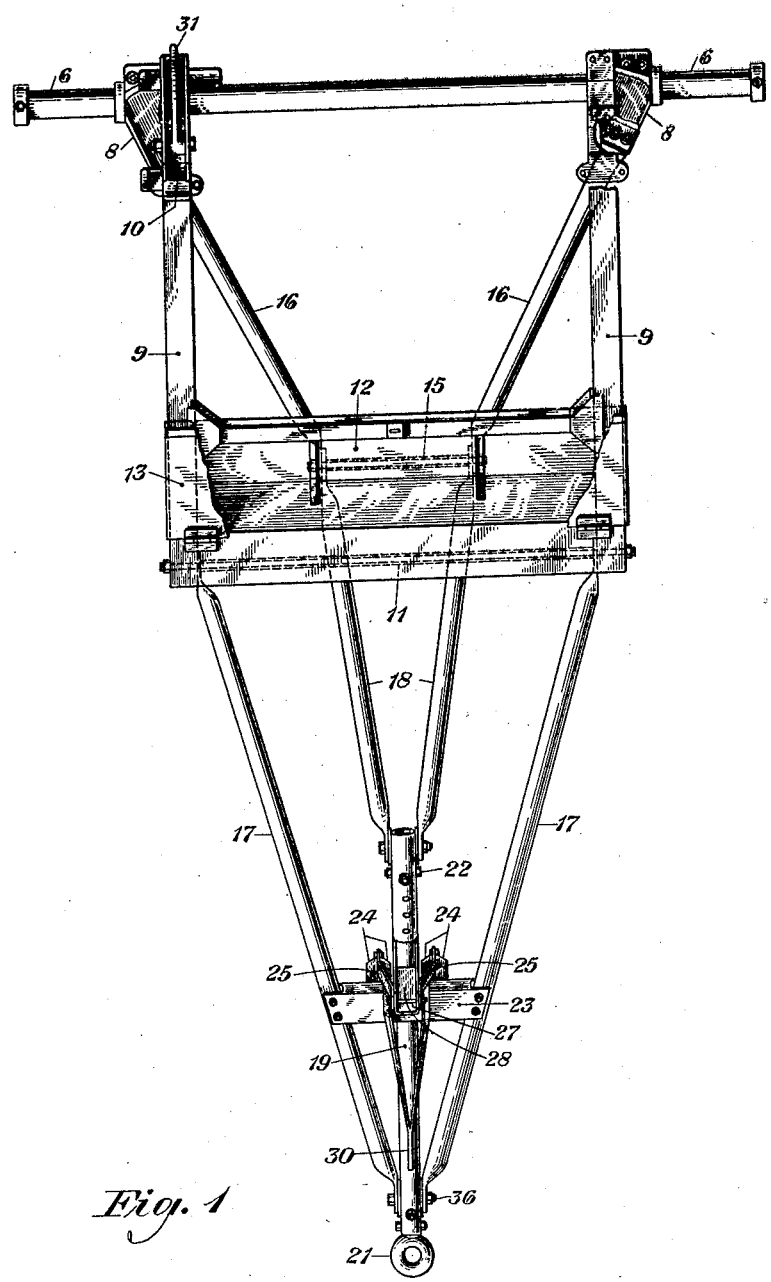

Referring to the drawings, in which the improved device is illustrated, the reference 5 is applied to the main frame or body portion which is carried on an axle 6. This axle may be supported on wheels or on a track assembly 7, as shown in Fig. 2. The main frame includes a pair of supports 8, 8 which are provided at their lower extremities with the usual axle boxes through which the axle 6 extends, and on their upper extremities carry the rear ends of parallel side members 9, 9. Saddle members 10 are positioned on the upper surfaces of the side members 9, 9 at these points and may be bolted, as shown, through the side members to the supports 8, 8. The forward ends of the side members 9, 9 are connected together by means of a cross-brace 11 which is bolted thereto. A further connection between the side members is provided at approximately this point by means of a tool box 12. This box is of substantially rectangular formation and extends below the side members, and is suitably connected at its ends to the lower surfaces of the side members. A cover 13 for this box is hinged to the upper surface of the side members, as more clearly shown in Fig. 2. The under side of the box 12 is provided with downwardly extending flanges 14 which are positioned inwardly from its sides and are interconnected by a transverse bar 15. Converging arms 16 are connected at their rear ends to flanges extending from the axle box of each of the supports 8, and are connected at their forward ends to the bar 15. The box 12 is of rugged construction and performs the dual function of providing a necessary receptacle to carry chains, tools and the like, and at the same time giving rigidity to the frame 5.

An articulated tongue is pivotally connected to the main frame and includes a pair of upper arms 17 and a pair of lower arms 18. These arms may be made of metal tubing or the like. The lower arms are pivoted at 20 to a forward bar 19 and at the other end are pivoted to the transverse bar 15. The upper arms 17 are pivotally connected at their rear ends to the cross-brace 11 and at their forward ends are pivotally connected to the forward extremity of the bar 19. The bar 19 is also pivoted and may be composed of two sections—the longer front tube and the shorter rear tube or socket. The forward tube is adapted to slide in the socket tube and openings are provided in these members through which bolts 22 may pass to permit adjustments to be made to lengthen or shorten the tongue. A towing eye 21 extends from the bar 19 and is adapted to be connected to a tractor or the like. By adjusting the tongue, the towing eye 21 may be raised or lowered (see dotted lines at the left in Fig. 2) without throwing the trailer out of balance, so that by proper adjustment of the tongue, the towing eye may fit any height of towing attachment carried by a truck or tractor.

The trailer is held in its extended position and released to a collapsed position by control or locking mechanism associated with the tongue member. This mechanism includes a cross-support 23 having channeled ends which are bolted about the upper arms 17 of the tongue. Two pairs of angle irons 24, 24 are brazed or otherwise suitably attached to the under side of the support 23. A toggle link 25 is pivotally mounted at one end between the contiguous surfaces of each pair of the members 24 on bolts 26 which extend through these members. The other ends of the links 25 are pivoted by a bolt 27 to the outside surfaces of a link 28 which is in the form of a channel. The link 28 at its other end is pivoted to the tubular member 19 by means of a bolt 29. The links 25 and 28 form a toggle joint which is actuated by a control handle 30 affixed at its ends to the inner sides of the links 25. The operation of the control handle 30 to the right from its position as shown in full lines in Fig. 2 permits the trailer to be collapsed to the position shown in dotted lines in this figure. In the normal position of the handle 30 the links 25 and the link 28 lie in an inclined position and in a parallel plane with respect to each other. Upon the rotation of the handle the links 25 rotate about their pivotal points 26 where they are connected to the members 24 carried by the upper tongue members 17, and the link 28 moves about its pivotal point 29 where it is connected to the lower tongue member 19. The other ends of the links 25 and 28 move about their common pivotal connection 27. This pivotal connection 27 is rotated by turning the handle 30 until this connection swings by center or the pivotal connection 29, thus causing the breaking of the pivotal connection 20 between the members 18 and 19 of the lower portion of the tongue. The breaking of these pivotal connections permit the tongue to be collapsed. In the collapsed position of the trailer as shown by dotted lines in Fig. 2, the pivoted members 18 and 19 of the tongue will assume a right angular position with respect to each other and the upper members 17 of the tongue will lie in substantially triangular formation therewith. The links 25 and 28 under this condition will form an obtuse angle formation. In the collapsed position of the trailer the pivotal point 20 or connecting point of the members 18 and 19 of the tongues comes in contact with the axle 6 and limits the collapsing movement of the trailer and also permits the trailer to be maneuvered without undue strain on these members.

A grab hook 31 is pivoted or trunnioned to the upper part of each saddle member 10. These members are adapted to hook over the ends of the spindle 32 projecting from a cable reel 33 in the collapsed position of the trailer. When the trailer is assuming its extended position the hooks 31 will lift the reel to a mounted position on the saddle members and the extended ends of the spindle 32 will be seated and locked by the hooks in the grooves 34. The spindle 32 when in position will lie in a vertical plane slightly to the rear of the axle. The positioning of the spindle and cable reel will thus properly balance the trailer when loaded. An additional groove may be provided on the forward portions of the saddle members to carry a spindle 35 or the like whereby crated or other objects may be secured to the spindle by means of a chain.

At the beginning of the loading operation, the trailer will be in its extended or normal position shown in full lines in Fig. 2. A tractor or other traction device is attached to the trailer by means of towing eye 21 and the track assembly is blocked to prevent movement of the trailer to the right. The operator now seizes the handle 30 and lifts upon it so that it moves in a counter clockwise direction. It will be noted that the pivots 27, 26 and 29 of the links 25 and 28 will be on dead center when they are in alignment but as shown in their normal position the pivot 26 is slightly off dead center to the right. When the handle 30 is moved clockwise it acts through link 25 to move the pivot member 27 in a clockwise direction, thus driving pivot member 26 through dead center and off dead center in a clockwise direction. As this movement continues an acute but continually widening angle is formed between the links 25 and 28 and as a consequence the distance between pivots 26 and 29 increases as will be evident from the fact that a line through these points subtends the angle above referred to. Now the pivot members 26 and 29 are fixed with respect to the arms 17 and 19 respectively of the tongue and as they separate the angle between arm 17 and 19 is increased thus breaking the normally straightened toggle joint formed by the arms 18 and 19.

The tractor is now driven in reverse gear (that is from left to right) causing further collapse of the toggle arms 18 and 19 and also causing a thrust along the arm 17 which tends to rotate the rigid main frame 8—9—12—16 about the axle 6 in a clockwise direction. As this movement continues the saddle members carried by the main frame are tilted rearwardly and downwardly and the collapsing of the toggle member of the tongue continues until the entire trailer occupies the fully collapsed position shown in dotted lines at the right of Fig. 2.

The blocks are now removed from the track assembly 7 of the trailer and the trailer is moved to the right so that it may receive or load a cable reel on its saddle members. The trailer is maneuvered so that the hooks 31 engage the ends of the spindle extending through the cable reel. The track assembly is now blocked to prevent forward motion and the tractor or other motive power attached to the trailer is advanced (from right to left) and draws the tongue with it to cause the trailer to again assume its extended position and lift the cable reel thereon.

In this movement the pull of the tractor on the arm 17 of the tongue swings the rigid main frame counter clockwise about the axle 6 and thus lifts the cable reel. Also the toggle arms 18 and 19 (which has been previously fully collapsed so that arm 19 was substantially horizontal and arm 18 substantially vertical) are gradually extended and straightened out. In the collapsed position of the trailer the pivots 26 and 29 of the toggle links 25 and 28 had been separated until the links formed the obtuse angle shown in dotted lines. As the toggle arms 18 and 19 straighten out the angle between arms 19 and 17 is necessarily decreased and the pivot members 26 and 28 of the toggle links are forced together. This causes the angle between the toggle links to decrease and then common pivot 27 to move in a counter clockwise direction.

As the main frame continues its movement towards the normal or extended position of the trailer, its momentum increases due to the weight of the cable reel which is now swinging in a more nearly horizontal direction and does not require much lifting efforts to complete its movement. This momentum is added to the forces already applied to the arms 17, 18 and 19 of the tongue by the tractor and unless some braking action is provided might cause the arms of the tongue to snap into their extended position with such force as to cause damage, especially as the movement of the arms 19 and 17 toward each other is very rapid as the normal position is approached.

The required braking action is afforded by the toggle links 25 and 28. At the beginning of the collapsing movement of these links the forces causing their collapse were applied to the links from the arms 17 and 19 at such an angle that the toggle links collapsed readily and provided a minimum of opposing force to the movement of the arms of the tongue. As the angle between toggle links 25 and 28 becomes more acute and the pivot 27 moves counter clockwise from a position between the arms 17 and 19 to a position above arm 17 the forces are gradually applied to the links more nearly lengthwise thereof. The forces applied to the links now substantially oppose each other and the components of these forces tending to bring the links 25 and 28 into their dead center alignment become smaller and smaller until moving parts come to rest with the toggle arms 18 and 19 almost straightened out. The toggle arms 18 and 19 as they straighten out cooperate with the links 25 and 28 to provide a braking action. Obviously as this position is reached the components lengthwise of the links are increased and they increasingly oppose or resist the momentum supplied by the weight of the cable reel and other moving parts.

As the mechanism comes to rest the collapsing movement of the toggle links 25 and 28 will stop with the links just past dead center and with the toggle arms 18 and 19 lying in a straight line. The movement of the tractor is of course brought to an end at this time. By this method the shock of the momentum of loading is absorbed by the locking toggle with no undue strain to any part of the equipment.

What is claimed is:

1. A trailer including an axle and mobile supporting members therefor, a main frame member and saddle members rigidly connected together and rotatably mounted on said axle, an articulated tongue structure including upper arms and lower arms pivotally connected to the main frame member so that the tongue structure and main frame member may be moved from an extended position to a collapsed position and back to an extended position, and means so connected to said upper arms and lower arms as to permit these members to move from an extended position to a collapsed position, said means serving to brake the momentum acting upon said members when returning from the collapsed position to the extended position.

2. A trailer including an axle and mobile supporting members therefor, a main frame member and saddle members rigidly connected together and rotatably mounted on said axle, an articulated tongue structure including upper arms and lower toggle arms hingedly connected together and to said main frame member so that the tongue structure and main frame member may be moved from an extended position to a collapsed position and back to an extended position, and toggle members connected to said upper arms and lower arms for breaking the toggle connection between said lower arms to cause the tongue structure to be collapsed to tilt said frame member, said toggle members serving to brake the momentum acting upon said upper and lower tongue members upon returning from a collapsed position to an extended position.

3. A trailer for carrying cable reels and the like including an axle and mobile supporting members therefor, a main frame member and saddle members rigidly connected together and rotatably mounted on said axle, an articulated tongue structure including upper arms and lower arms pivotally connected to the main frame member so that the tongue structure and main frame member may be moved from an extended position to a collapsed position and back to an extended position, means so connected to said upper arms and lower arms as to permit these members to move from an extended position to a collapsed position, said means serving to brake the momentum acting upon said members when returning from the collapsed position to the extended position, and gripping means for engaging and locking a cable reel on the saddle members.

4. A trailer for carrying cable reels and the like including an axle and mobile supporting members therefor, a main frame member and saddle members rigidly connected together and rotatably mounted on said axle, an articulated tongue structure including upper arms and lower toggle arms hingedly connected together and to said main frame member so that the tongue structure and main frame member may be moved from an extended position to a collapsed position and back to an extended position, the pivotal point of said toggle arms in collapsed position contacting with said axle to limit the further collapse of said tongue, toggle members connected to said upper arms and lower arms for breaking the toggle connection between said lower arms to cause the tongue structure to be collapsed to tilt said frame member, said toggle members serving to brake the momentum acting upon said upper and lower tongue members upon returning from a collapsed position to an extended position, and gripping means pivotally mounted on the saddle members for engaging and lifting the cable reel in mounted position on said saddle members and locking said reel in such position.

5. A trailer including an axle and mobile supporting members therefor, a main frame member and saddle members rigidly connected together and rotatably mounted on said axle, an articulated tongue structure including upper arms and lower toggle arms pivotally connected to the main frame member so that the tongue structure and main frame member may be moved from an extended position to a collapsed position and back to an extended position, and toggle links pivotally connected to said upper arms and lower arms and movable in one direction to permit said arms to move from an extended position to a collapsed position, said links being movable in the opposite direction to brake the momentum acting upon said arms when returning from the collapsed position to the extended position.

6. A trailer including an axle and mobile supporting members therefor, a main frame member and saddle members rigidly connected together and rotatably mounted on said axle, an articulated tongue structure including upper arms and lower toggle arms pivotally connected to the main frame member so that the tongue structure and main frame member may be moved from an extended position to a collapsed position and back to an extended position, said tongue member in its collapsed position having its toggle arms broken and lying in a right angular position to each other with the joint formed between the arms abutting said axle to prevent further collapse of the trailer, and means so connected to said upper arms and lower arms as to permit these members to move from an extended position to a collapsed position, said means serving to brake the momentum acting upon said members when returning from the collapsed position to the extended position.

7. A trailer including an axle and mobile supporting members therefor, a main frame member and saddle members rigidly connected together and rotatably mounted on said axle, an articulated tongue structure including upper arms and lower toggle arms hingedly connected together and to said main frame member so that the tongue structure and main frame member may be moved from an extended position to a collapsed position and back to an extended position, toggle members connected to said upper arms and lower arms for breaking the toggle connection between said lower arms to cause the tongue structure to be collapsed to tilt said frame member, said toggle members serving to brake the momentum acting upon said upper and lower tongue members upon returning from a collapsed position to an extended position, and adjusting means for said tongue structure for maintaining the balance of the trailer when the tongue structure is positioned at different levels.

8. A trailer for carrying cable reels and the like including an axle and mobile supporting members therefor, a main frame member and saddle members rigidly connected together and rotatably mounted on said axle, an articulated tongue structure including upper arms and lower toggle arms pivotally connected to the main frame member so that the tongue structure and main frame member may be moved from an extended position to a collapsed position and back to an extended position, toggle links pivotally connected to said upper arms and lower arms and movable in one direction to permit said arms to move from an extended position to a collapsed position, said links being movable in the opposite direction to brake the momentum acting upon said arms when returning from the collapsed position to the extended position, and adjusting means for said tongue structure for maintaining the balance of the trailer under different weights of cable reel.

In testimony whereof, I have signed my name to this specification this 28th day of May, 1931.

EDGAR E. KELLEMS.